Patented Sept. 5, 1933

1,925,829

UNITED STATES PATENT OFFICE 1,925,829

PROCESS FOR DRAWING CELLULOSE ACETATE THREADS

Alfons Ascherl and Wolfgang Gruber, Burghausen, Germany, assignors to Dr. Alexander Wacker Gesellschaft fur Elektrochemische Industrie, Munich, Bavaria, Germany, a corporation No Drawing. Application May 20, 1931, Serial No. 538,872, and in Germany September 23, 1930

8 Claims. (Cl. 18—54)

This invention relates to drawing cellulose acetate threads and more particularly to the process of drawing cellulose acetate threads by wet spinning a solution of cellulose acetate.

It is well known that in spinning a solution of cellulose acetate and acetone that the precipitation of the threads can be delayed by the addition of acetic ester, pyridine, etc., whereby a drawing of the threads is possible.

It is also known that a mixture of non-solvents may be used as a solvent for the cellulose acetate. The mixture of non-solvents is composed of two or more substances each of which does not dissolve cellulose acetate, but which mixture will dissolve the cellulose acetate, and at least one of the components of the mixture must be soluble in the precipitate bath.

We have now discovered that an unexpected improvement results and that the threads will be discharged from the nozzle in a plastic state if only so much of the component, which is soluble in the precipitate bath, is used as will just form a solution of cellulose acetate.

When the soluble component of the mixture of non-solvents is dissolved in the precipitate bath, the cellulose acetate is precipitated in a suitable condition for drawing. According to this invention, a spinning velocity of 100 meters per minute and thereabouts is possible and threads of .2 to .3 deniers may be produced.

The use of a mixture of non-solvents possesses the further advantage that the threads may be formed with a very high lustre even if spun in substantially pure water, which result has not been realized according to any of the other processes heretofore known. In order to produce a high lustre, it has been customary to add calcium chloride, sodium acetate and other substances to the precipitate bath. The addition of these substances possesses the disadvantage that regeneration of the precipitate bath and recovery of the solvent is made very difficult or impossible.

The cellulose acetate solution may be spun, according to this invention, alone or mixed with resin, softening material or a soluble cellulose derivative.

Example.—10 parts of cellulose acetate were well mixed with 40 parts of dichlorethylene and sufficient alcohol was added to just form a solution. According to the cellulose acetate used, between 8 to 10 parts of alcohol are required. The cellulose acetate was spun in water of 40 to 50° by any well known wet spinning process. With a spinning velocity of over 100 meters per minute and a nozzle of one-tenth millimeter diameter, threads were formed of about .3 deniers and had a tensile strength of about 200 grams per 100 deniers.

The invention claimed is:

1. The process of drawing cellulose acetate threads which comprises dissolving about 10 parts of cellulose acetate in a mixture of 8–10 parts alcohol and about 40 parts of dichlorethylene, and wet-spinning the solution and dissolving the alcohol in a precipitation bath of water to precipitate the cellulose acetate threads.

2. The process of drawing cellulose acetate threads which comprises dissolving about 10 parts of cellulose acetate in a mixture of 8–10 parts of alcohol and about 40 parts of dichlorethylene, and wet-spinning the solution in substantially pure water at 40–50° C.

3. The process of drawing cellulose acetate threads which comprises dissolving cellulose acetate in a mixture of dichlorethylene and a minimum amount of alcohol and wet-spinning the solution in water at a velocity of about 100 meters per minute.

4. The process of drawing cellulose acetate threads which comprises dissolving about 10 parts of cellulose acetate in a mixture of 8–10 parts alcohol and about 40 parts of dichlorethylene, and wet-spinning the solution in substantially pure water at 40–50° C. at a velocity of about 100 meters per minute.

5. The process of drawing cellulose acetate threads which comprises dissolving about 10 parts of cellulose acetate in a mixture of 8–10 parts of alcohol and about 40 parts of dichlorethylene, and wet-spinning the solution with resin in substantially pure water at 40–50° C. at a velocity of about 100 meters per minute.

6. The process of drawing cellulose acetate threads which comprises dissolving cellulose acetate in a mixture of dichlorethylene and a minimum amount of alcohol, and wet spinning the solution in water.

7. The process of drawing cellulose acetate threads which comprises dissolving about 10 parts of cellulose acetate in a mixture of 8-10 parts of alcohol and about 40 parts of dichlorethylene, and wet spinning the solution with a softening means in substantially pure water at 40-50° C. at a velocity of about 100 meters per minute.

8. The process of drawing cellulose acetate threads which comprises dissolving about 10 parts of cellulose acetate in a mixture of 8-10 parts of alcohol and about 40 parts of dichlorethylene, and wet spinning the solution with a soluble cellulose derivative in substantially pure water at 40-50° C. at a velocity of about 100 meters per minute.

ALFONS ASCHERL.
WOLFGANG GRUBER.